United States Patent
Qian et al.

(10) Patent No.: US 11,502,300 B1
(45) Date of Patent: Nov. 15, 2022

(54) SECONDARY BATTERY

(71) Applicant: SHENZHEN CAPCHEM TECHNOLOGY CO., LTD., Guangdong (CN)

(72) Inventors: Yunxian Qian, Guangdong (CN); Shiguang Hu, Guangdong (CN); Yonghong Deng, Guangdong (CN); Hongmei Li, Guangdong (CN); Xiaoxia Xiang, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/630,514

(22) PCT Filed: Dec. 27, 2021

(86) PCT No.: PCT/CN2021/141757
§ 371 (c)(1),
(2) Date: Jan. 27, 2022

(30) Foreign Application Priority Data

Oct. 13, 2021 (CN) .......................... 202111189949.7

(51) Int. Cl.
*H01M 4/131* (2010.01)
*H01M 4/60* (2006.01)
(Continued)

(52) U.S. Cl.
CPC .............. *H01M 4/60* (2013.01); *H01M 4/364* (2013.01); *H01M 4/505* (2013.01); *H01M 4/525* (2013.01);
(Continued)

(58) Field of Classification Search
CPC ........ H01M 4/60; H01M 4/364; H01M 4/505; H01M 4/525; H01M 10/0567; H01M 2004/028; H01M 2300/0025
See application file for complete search history.

(56) References Cited

U.S. PATENT DOCUMENTS

2012/0171542 A1   7/2012   Matsumoto et al.

FOREIGN PATENT DOCUMENTS

CN   101192682 A   6/2008
CN   104584289 A   4/2015
(Continued)

OTHER PUBLICATIONS

Machine translation of WO 2021-200394, retrieved from ,www.espacenet.com> on Jul. 14, 2022.*

(Continued)

*Primary Examiner* — Cynthia K Walls

(57) ABSTRACT

Provided is a secondary battery, comprising a positive electrode, the positive electrode comprises a positive electrode material layer, and the positive electrode material layer comprises a positive electrode active material and a compound represented by structural formula I:

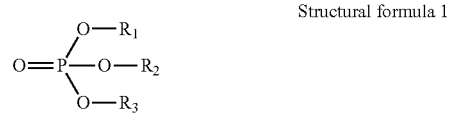

Structural formula 1 the positive electrode active material includes one or more of the compounds represented by $Li_{1+x}Ni_aCo_bM'_{1-a-b}O_{2-y}A_y$ and $Li_{1+z}Mn_cL_{2-c}O_{4-d}B_d$;
the positive electrode material layer meets the following requirements:
(Continued)

$0.05 \leq p \cdot u/v \leq 15$ wherein, u is the percentage mass content of element phosphorus in the positive electrode material layer, and the unit is wt %;

v is the percentage mass content of element M in the positive electrode material layer, element M is selected from one or two of Mn and Al, and the unit is wt %;

p is the surface density of one single surface of the positive electrode material layer, and the unit is mg/cm$^2$.

15 Claims, 1 Drawing Sheet

(51) Int. Cl.
*H01M 10/0567* (2010.01)
*H01M 4/36* (2006.01)
*H01M 4/525* (2010.01)
*H01M 4/505* (2010.01)
*H01M 4/02* (2006.01)

(52) U.S. Cl.
CPC .. *H01M 10/0567* (2013.01); *H01M 2004/028* (2013.01); *H01M 2300/0025* (2013.01)

(56) References Cited

FOREIGN PATENT DOCUMENTS

| | | |
|---|---|---|
| CN | 104659370 A | 5/2015 |
| CN | 105336979 A | 2/2016 |
| CN | 106898827 A | 6/2017 |
| CN | 109841908 A | 6/2019 |
| CN | 109888368 A | 6/2019 |
| CN | 110444764 A | 11/2019 |
| CN | 112271325 A | 1/2021 |
| CN | 112271337 A | 1/2021 |
| CN | 113644275 A | 11/2021 |
| CN | 113972366 A | 1/2022 |
| CN | 113644275 B | 2/2022 |
| JP | 2002270184 A | 9/2002 |
| JP | 2015162356 A | 9/2015 |
| WO | 2021111931 A1 | 6/2021 |
| WO | WO 2021-200394 | * 10/2021 .......... H01M 10/052 |

OTHER PUBLICATIONS

Notice of Allowance of counterpart Chinese Patent Application No. 202111189949.7 dated Jan. 12, 2022.

1st Office Action of counterpart Chinese Patent Application No. 202111189949.7 dated Nov. 19, 2021.

* cited by examiner

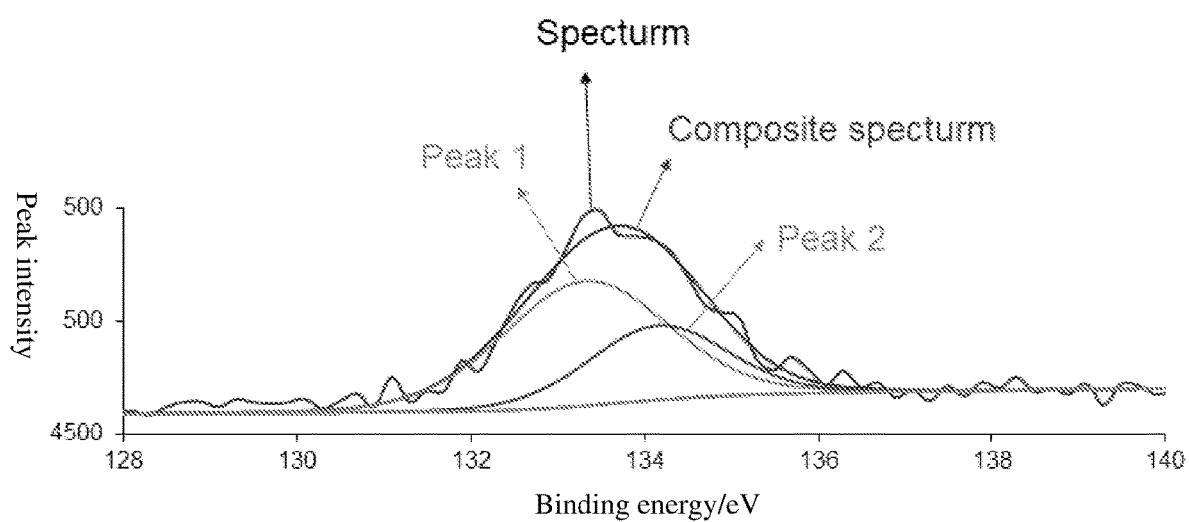

SECONDARY BATTERY

TECHNICAL FIELD

The present application belongs to the technical field of energy storage electronic components, and particularly relates to a secondary battery.

BACKGROUND lithium-ion battery has been widely used in mobile communication, notebook computer and other fields since it was put into the market in 1991 because of its advantages of high working voltage, long cycle life, high energy density and no memory effect. The charge and discharge process of lithium-ion battery is the process of deintercalation and intercalation of lithium-ion at positive electrode and negative electrode. And, the positive plate made of positive materials is the only (or main) provider of lithium-ions in lithium-ion batteries, and the type of positive materials also determines the energy density of lithium-ion batteries.

With the increasing application of lithium-ion secondary batteries, people have higher requirements for the safety performance of lithium-ion secondary batteries. lithium-ion secondary batteries with ternary positive active materials have large discharge capacity and high energy density, which are very potential lithium-ion secondary batteries, but their safety performance is poor. As people put forward higher and higher requirements for the performance of lithium-ion secondary batteries, besides excellent high-temperature storage and cycle performance, how to make lithium-ion secondary batteries have higher safety performance has become a technical problem to be solved urgently. Especially, as the power supply of electric vehicles or electronic products, the safety of lithium-ion secondary batteries under different conditions is directly related to the life safety of users.

SUMMARY

Aiming at the problem that the existing secondary battery has insufficient safety performance, the present application provides a secondary battery.

The technical solution adopted by the present application to solve the above technical problems is as follows:

The present application provides a secondary battery, including a positive electrode, the positive electrode includes a positive electrode material layer, the positive electrode material layer includes a positive electrode active material and a compound represented by structural formula 1:

Structural formula 1

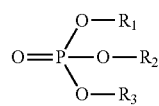

wherein $R_1$, $R_2$ and $R_3$ are each independently selected from an alkyl group with 1-5 carbon atoms, a fluoroalkyl group with 1-5 carbon atoms, an ether group with 1-5 carbon atoms, a fluoroether group with 1-5 carbon atoms and an unsaturated hydrocarbon group with 2-5 carbon atoms, and at least one of $R_1$, $R_2$ and $R_3$ is an unsaturated hydrocarbon group with 2-5 carbon atoms;

The positive electrode active material includes one or more of the compounds represented by formula (1) and formula (2);

$$Li_{1+x}Ni_aCo_bM'_{1-a-b}O_{2-y}A_y \quad \text{formula (1)}$$

$$Li_{1+z}Mn_cL_{2-c}O_{4-d}B_d \quad \text{formula (2)}$$

in formula (1), $-0.1 \leq x \leq 0.2$, $0<a<1$, $0 \leq b<1$, $0<a+b<1$, $0 \leq y<0.2$, M' includes one or more of Mn and Al, and includes none, one or more of Sr, Mg, Ti, Ca, Zr, Zn, Si, Fe and Ce, A includes one or more of S, N, F, Cl, Br and I;

in formula (2), $-0.1 \leq z \leq 0.2$, $0<c \leq 2$, $0 \leq d<1$, L includes one or more of Ni, Fe, Cr, Ti, Zn, V, Al, Mg, Zr and Ce, and B includes one or more of S, N, F, Cl, Br and I;

the positive electrode material layer meets the following requirements:

$$0.05 \leq p \cdot u/v \leq 15$$

wherein, u is the percentage mass content of element phosphorus in the positive electrode material layer, and the unit is wt %;

v is the percentage mass content of element M in the positive electrode material layer, element M is selected from one or two of Mn and Al, and the unit is wt %;

p is the surface density of one single surface of the positive electrode material layer, and the unit is mg/cm².

Optionally, the positive electrode material layer meets the following requirements:

$$0.1 \leq p \cdot u/v \leq 10;$$

Preferably, the positive electrode material layer meets the following requirements:

$$0.5 \leq p \cdot u/v \leq 5.$$

Optionally, the compound represented by structural formula 1 includes at least one selected from the group consisting of phosphoric acid tripropargyl ester, dipropargyl methyl phosphonate, dipropargyl fluoromethyl phosphonate, dipropargyl methoxymethyl phosphate, dipropargyl ethyl phosphate, dipropargyl propyl phosphate, trifluoromethyl dipropargyl phosphate, 2, 2, 2-trifluoroethyl phosphate, dipropargyl 3, 3, 3-trifluoropropyl phosphate, hexafluoroisopropyl dipropargyl phosphate, phosphoric acid triallyl ester, diallyl methyl phosphate, diallyl ethyl phosphate, diallyl propyl phosphate, trifluoromethyl diallyl phosphate, 2, 2, 2-trifluoroethyl diallyl phosphate, dipropargyl methyl ether phosphate, dipropargyl fluoromethyl ether phosphate, diallyl 3, 3, 3-trifluoropropyl phosphate or diallyl hexafluoroisopropyl phosphate.

Optionally, the surface of the positive electrode material layer is detected by X-ray photoelectron spectroscopy, and when 1s peak of carbon is obtained at 284.5 eV, a characteristic peak of element phosphorus appears at the range of 130-140 eV.

Optionally, in the positive electrode material layer, the percentage mass content (u) of element phosphorus is 0.1 wt %-3 wt %;

Preferably, in the positive electrode material layer, the percentage mass content (u) of element phosphorus is 0.1 wt %-2 wt %;

Optionally, in the positive electrode material layer, the percentage mass content (v) of element M is 3 wt %-60 wt %;

Preferably, in the positive electrode material layer, the percentage mass content (v) of element M is 3 wt %-30 wt %.

Optionally, the surface density of one single surface (p) of the positive electrode material layer is 10-30 mg/cm²;

Preferably, the surface density of one single surface (p) of the positive electrode material layer is 15-20 mg/cm$^2$.

Optionally, the secondary battery further includes a non-aqueous electrolyte, and the non-aqueous electrolyte includes an additive, the additive includes at least one of cyclic sulfate compound, sultone compound, cyclic carbonate compound, unsaturated phosphate compound and nitrile compound.

Optionally, the additive is added in an amount of 0.01%-30% based on the total mass of the non-aqueous electrolyte being 100%;

Preferably, the additive is added in an amount of 0.01%-10% based on the total mass of the non-aqueous electrolyte being 100%.

Optionally, the cyclic sulfate compound is at least one selected from ethylene sulfate, trimethylene sulfite or methyl ethylene sulfate;

the sultone compound is at least one selected from 1,3-propane sultone, 1,4-butane sultone or 1,3-propene sultone;

the cyclic carbonate compound is selected from at least one of vinylene carbonate, vinylethylene carbonate, fluoroethylene carbonate or the compound represented by structural formula 2.

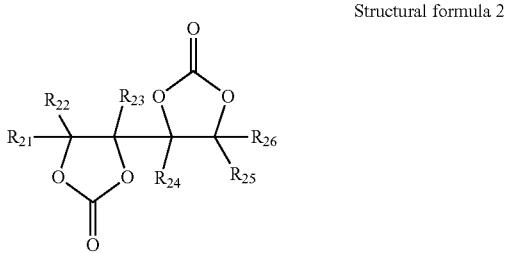

Structural formula 2 in structural formula 2, $R_{21}$, $R_{22}$, $R_{23}$, $R_{24}$, $R_{25}$ and $R_{26}$ are each independently selected from one of a hydrogen atom, a halogen atom and a C1-C5 group;

the unsaturated phosphate compound is selected from at least one of the compounds represented by structural formula 3:

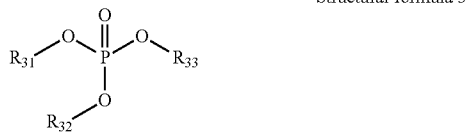

Structural formula 3 in structural formula 3, $R_{31}$, $R_{32}$ and $R_{32}$ are each independently selected from a C1-05 saturated hydrocarbon group, an unsaturated hydrocarbon group, a halogenated hydrocarbon group and —Si($C_mH_{2m+1}$)$_3$, m is a natural number of 1-3, and at least one of $R_{31}$, $R_{32}$ and $R_{33}$ is an unsaturated hydrocarbon group;

the nitrile compound includes one or more of butanedinitrile, glutaronitrile, ethylene glycol bis (propionitrile) ether, hexanetricarbonitrile, adiponitrile, pimelic dinitrile, hexamethylene dicyanide, azelaic dinitrile and sebaconitrile.

According to the battery provided by the present application, the compound represented by structural formula 1 is added into the positive electrode material layer. Meanwhile, the relationship among the percentage mass content (u) of element phosphorus, the percentage mass content (v) of element Mn and/or Al in the positive electrode material layer and the surface density (p) of one single side of the positive electrode material layer is reasonably designed. When the positive electrode material layer meets the condition of 0.05≤p·u/v≤15, the synergistic effect between the compound represented by structural formula 1 and the selected element and surface density of the positive electrode active material can be fully exerted, so that the positive electrode active material has high structural stability, and the side reaction of the non-aqueous electrolyte on the surface of the positive electrode material layer is obviously reduced. Especially, the thermal shock resistance of the battery is also remarkably improved, and the safety performance of the battery is greatly improved.

BRIEF DESCRIPTION OF DRAWINGS

The sole figure is XPS spectrum of positive plate in a secondary battery provided by Embodiment 3 of the present application.

DETAILED DESCRIPTION OF DISCLOSED EMBODIMENTS

In order to make the technical problems to be solved, technical solutions and beneficial effects of the present application more clear, the present application will be further described in detail below with embodiments. It should be understood that the specific embodiments described here are only used to illustrate the application, instead of limiting the application.

The embodiments of the present application provides a secondary battery, including a positive electrode, a negative electrode and a non-aqueous electrolyte. The positive electrode includes a positive electrode material layer, the positive electrode material layer includes a positive electrode active material and a compound represented by structural formula 1:

Structural formula 1 wherein $R_1$, $R_2$ and $R_3$ are each independently selected from an alkyl group with 1-5 carbon atoms, a fluoroalkyl group with 1-5 carbon atoms, an ether group with 1-5 carbon atoms, a fluoroether group with 1-5 carbon atoms and an unsaturated hydrocarbon group with 2-5 carbon atoms, and at least one of $R_1$, $R_2$ and $R_3$ is an unsaturated hydrocarbon group with 2-5 carbon atoms;

The positive electrode active material includes one or more of the compounds represented by formula (1) and formula (2);

formula (1)

formula (2)

in formula (1), −0.1≤x≤0.2, 0<a<1, 0≤b<1, 0<a+b<1, 0≤y<0.2, M' includes one or more of Mn and Al, and includes none, one or more of Sr, Mg, Ti, Ca, Zr, Zn, Si, Fe and Ce, A includes one or more of S, N, F, Cl, Br and I;

in formula (2), −0.1≤z≤0.2, 0<c≤2, 0≤d<1, L includes one or more of Ni, Fe, Cr, Ti, Zn, V, Al, Mg, Zr and Ce, and B includes one or more of S, N, F, Cl, Br and I;

the positive electrode material layer meets the following requirements:

$$0.05<p\cdot u/v\leq 15$$

wherein, u is the percentage mass content of element phosphorus in the positive electrode material layer, and the unit is wt %;

v is the percentage mass content of element M in the positive electrode material layer, element M is selected from one or two of Mn and Al, and the unit is wt %;

p is the surface density of one single surface of the positive electrode material layer, and the unit is mg/cm².

Although the action mechanism of the compound represented by structural formula 1 in the positive electrode of the battery of the present application is not very clear, the inventor(s) speculated that in the present application, when the compound represented by structural formula 1 was added into the positive electrode material layer, the compound covered the surface of the positive electrode active material particles, which could not only better protect the positive electrode active material, but also significantly improve the flame retardant performance of the positive electrode material layer. At the same time, the inventor(s) found that, the compound represented by structural formula 1 had great differences in cooperation effects with different positive electrode active materials and different surface densities of positive electrode material layer. In particular, the compound represented by structural formula 1 had good affinity effects with elements Mn and Al, and the combination of the two could improve the stability of positive electrode active materials in long-term cycle. In addition, the compound represented by structural formula 1 would inevitably occupy the deintercalation and intercalation positions of alkali metal ions in the positive electrode active material, especially when the surface density of one single surface of the positive electrode material layer was too high or too low. It is speculated that after the compound represented by structural formula 1 is added, its mutual coordination with elements Mn, Al and surface density would affect the migration of alkali metal ions in the positive electrode material layer, which would have a direct impact on the internal resistance and high-rate charge-discharge performance of the battery. At the same time, the compound represented by structural formula 1, the selection of the positive electrode active material and the surface density of one single surface of the positive electrode material layer also affect the stability of the passivation film on the surface of the positive electrode material layer. Therefore, through comprehensive study and designed experiments, the inventor(s) concluded the relational expression of $0.05\leq p\cdot u/v\leq 15$, which reasonably quantified the factors of the compound represented by structural formula 1, elements Mn, Al, and surface density, and a battery with high energy density and excellent safety performance was obtained.

In a preferred embodiment, the positive electrode material layer meets the following requirements:

$$0.1\leq p\cdot u/v\leq 10;$$

In a more preferred embodiment, the positive electrode material layer meets the following requirements:

$$0.5\leq p\cdot u/v\leq 5.$$

When the percentage mass content (u) of element phosphorus, percentage mass content (v) of element Mn and/or Al in the positive electrode material layer and the surface density of one single surface (p) of the positive electrode material layer are within the above-mentioned range of the relational expression, the thermal shock resistance of the battery can be further improved.

In the present application, when the positive electrode active material only contains element Mn, the percentage mass content of element M in the positive electrode material layer refers to the percentage mass content of element Mn. When the positive electrode active material only contains Al, the percentage mass content of element M in the positive electrode material layer refers to the percentage mass content of element Al. When the positive electrode active material contains both elements Al and Mn, the percentage mass content of element M in the positive electrode material layer refers to the sum of percentage mass content of elements Al and Mn.

In the description of the present application, the term "surface density of one single surface of the positive electrode material layer" refers to the coating weight of the positive electrode material layer on the single surface of the positive electrode per unit area, and the following ways may be adopted as the coating weight measurement method: take 30 pieces of current collector foil, in which the area of each piece is S1, respectively weigh its weight, and take the average value as W1; coat slurry with the same weight on one side of each current collector foil, dry at 120° C. for 1 hour after uniform coating, after detect that there is basically no solvent, respectively weigh the dried single-sided slurry coated current collector foil, and take the average value as W2; then the surface density W=(W2−W1)/S1 of the single-sided active material layer on the current collector can be obtained.

In the present application, the alkyl group with 1-5 carbon atoms may be selected from, for example, methyl, ethyl, n-propyl, isopropyl, n-butyl, isobutyl, sec-butyl, tert-butyl, n-amyl, isoamyl, sec-pentyl or neopentyl. The fluoroalkyl group with 1-5 carbon atoms is selected from a group in which one or more hydrogen elements in the alkyl group with 1-5 carbon atoms are substituted by fluorine elements.

The unsaturated hydrocarbon group with 2-5 carbon atoms may be selected from, for example, vinyl, propenyl, allyl, butenyl, pentenyl, methyl vinyl, methyl allyl, ethynyl, propinyl, propargyl, butynyl and pentynyl.

The ether group with 1-5 carbon atoms may be selected from, for example, methyl ether, diethyl ether, ethyl methyl ether, propyl ether, methyl propyl ether and ethyl propyl ether.

The fluoroether group with 1-5 carbon atoms may be selected from, for example, fluoromethyl ether, fluoroethyl ether, fluoromethyl ethyl ether, fluoropropyl ether, fluoromethyl propyl ether and fluoroethyl propyl ether.

In some embodiments, the compound represented by structural formula 1 includes at least one selected from the group consisting of phosphoric acid tripropargyl ester, dipropargyl methyl phosphonate, dipropargyl fluoromethyl phosphonate, dipropargyl methoxymethyl phosphate, dipropargyl ethyl phosphate, dipropargyl propyl phosphate, trifluoromethyl dipropargyl phosphate, 2, 2, 2-trifluoroethyl phosphate, dipropargyl 3, 3, 3-trifluoropropyl phosphate, hexafluoroisopropyl dipropargyl phosphate, phosphoric acid triallyl ester, diallyl methyl phosphate, diallyl ethyl phosphate, diallyl propyl phosphate, trifluoromethyl diallyl phosphate, 2, 2, 2-trifluoroethyl diallyl phosphate, dipropargyl methyl ether phosphate, dipropargyl fluoromethyl ether phosphate, diallyl 3, 3, 3-trifluoropropyl phosphate or diallyl hexafluoroisopropyl phosphate.

The above compounds may be used alone or in combination of two or more.

In some embodiments, the surface of the positive electrode material layer is detected by X-ray photoelectron spectroscopy, and when 1s peak of carbon is obtained at 284.5 eV, a characteristic peak of element phosphorus appears at the range of 130-140 eV. As shown in the sole figure, which shows that the compound represented by structural formula 1 participates in the formation of passivation film on the surface of the positive electrode material layer.

In some embodiments, in the positive electrode material layer, the percentage mass content (u) of element phosphorus is 0.1 wt %-3 wt %.

In a preferred embodiment, in the positive electrode material layer, the percentage mass content (u) of element phosphorus is 0.1 wt %-2 wt %.

Specifically, in the positive electrode material layer, the percentage mass content (u) of element phosphorus may be 0.1 wt %, 0.2 wt %, 0.5 wt %, 0.8 wt %, 1.0 wt %, 1.5 wt %, 2.0 wt %, 2.5 wt % or 3 wt %.

The element phosphorus is derived from the compound represented by structural formula 1, and its percentage mass content is positively correlated with the added amount of the compound represented by structural formula 1. Because the compound represented by structural formula 1 includes phosphate-containing group, it has good flame retardant characteristics. And it can form a stable passivation film containing element phosphorus on the interface between the positive electrode material layer and the non-aqueous electrolyte. The passivation film can inhibit excessive side reactions between the positive electrode material layer and the non-aqueous electrolyte, which effectively prevents manganese or aluminum ions dissolved from the positive electrode active material from entering the negative electrode material layer, thus improving the structural stability of the positive electrode active material, and further improving the thermal stability of the lithium-ion battery.

In some embodiments, in the positive electrode material layer, the percentage mass content (v) of element M is 3 wt %-60 wt %;

In some embodiments, in the positive electrode material layer, the percentage mass content (v) of element M is 3 wt %-30 wt %.

Specifically, in the positive electrode material layer, the percentage mass content (v) of element M may be 3 wt %, 5 wt %, 8 wt %, 10 wt %, 12 wt %, 15 wt %, 21 wt %, 23 wt %, 27 wt %, 30 wt %, 36 wt %, 42 wt %, 48 wt %, 50 wt %, 55 wt % or 60 wt %.

Manganese or aluminum in the positive electrode active material can ensure the structural stability of the positive electrode active material, reduce the decomposed oxygen of the positive electrode active material, inhibit gas generation and reduce heat generation, thereby reducing the risk of runaway of the secondary battery and making the secondary battery have higher safety performance.

In some embodiments, the surface density of one single surface (p) of the positive electrode material layer is 10-30 mg/cm$^2$;

In a preferred embodiment, the surface density of one single surface (p) of the positive electrode material layer is 15-20 mg/cm$^2$.

Specifically, the surface density of one single surface (p) of the positive electrode material layer may be 10 mg/cm$^2$, 12 mg/cm$^2$, 14 mg/cm$^2$, 16 mg/cm$^2$, 18 mg/cm$^2$, 21 mg/cm$^2$, 24 mg/cm$^2$, 28 mg/cm$^2$ or 30 mg/cm$^2$.

The surface density of one single surface of the positive electrode material layer is a key technical parameter for the design and manufacture of secondary battery. With the same length of positive plate, if the surface density of one single surface of the positive electrode material layer is large, the capacity of the battery would increase, and the temperature rise of the battery during charging would be large, which would affect the safety performance. However, if the surface density of one single surface of the positive electrode plate is small, the capacity of the battery would decrease, and the temperature rise of the battery during charging would be small.

The above analysis is only based on the influence of each parameter on the battery alone, but in the actual battery application process, the above three parameters are interrelated and inseparable. The relational expression given by the present application relates the three factors, which jointly affect the capacity and thermal shock resistance of the battery. Therefore, the ratio of the percentage mass content of element phosphorus and element M in the positive electrode plate and the parameter of surface density of one single surface of the positive electrode material layer can be adjusted to $0.05 \leq p \cdot u/v \leq 15$, so that the safety and other performance of lithium-ion secondary batteries can be effectively improved on the premise of ensuring the high specific capacity and energy density of secondary batteries. If the value of $p \cdot u/v$ is too high or too low, the dynamics of the battery would deteriorate, which makes it easy for the battery to catch fire in extreme environment, and there is a potential safety hazard.

In some embodiments, the positive electrode material layer further includes a positive electrode binder and a positive electrode conductive agent. The positive electrode active material, the compound represented by structural formula 1, the positive electrode binder and the positive electrode conductive agent are blended to obtain the positive electrode material layer.

Based on the total mass of the positive electrode material layer being 100%, the percentage mass content of the positive electrode binder is 1-2%, and the percentage mass content of the positive electrode conductive agent is 0.5-2%.

The positive electrode binder includes one or more of polyvinylidene fluoride, vinylidene fluoride copolymer, polytetrafluoroethylene, vinylidene fluoride-hexafluoropropylene copolymer, tetrafluoroethylene-hexafluoropropylene copolymer, tetrafluoroethylene-perfluoroalkyl vinyl ether copolymer, ethylene-tetrafluoroethylene copolymer, vinylidene fluoride-tetrafluoroethylene copolymer, vinylidene fluoride-trifluoroethylene copolymer, vinylidene fluoride-trichloroethylene copolymer, vinylidene fluoride-fluoroethylene copolymer, and thermoplastic resins such as vinylidene fluoride-hexafluoropropylene-tetrafluoroethylene copolymer, thermoplastic polyimide, polyethylene and polypropylene; acrylic resin; sodium carboxymethyl cellulose; polyvinyl butyral; ethylene-vinyl acetate copolymer; polyvinyl alcohol; and styrene butadiene ribber.

The positive electrode conductive agent includes one or more of conductive carbon black, conductive carbon balls, conductive graphite, conductive carbon fibers, carbon nanotubes, graphene or reduced graphene oxide.

In some embodiments, the compound represented by structural formula 1 is formed on the surface of the positive electrode material layer, or the compound represented by structural formula 1 is mixed inside the positive electrode material layer.

In the case of the compound represented by structural formula 1 is formed on the surface of the positive electrode material layer, its preparation method may be as follows.

A coating containing the compound represented by structural formula 1 is formed on the surface of the positive electrode material layer by surface coating. Specifically, the positive electrode active material, the positive electrode conductive agent and the positive electrode binder can be dispersed in an organic solvent to prepare a positive electrode paste; after the positive electrode paste is coated and dried to form a positive electrode material layer, the compound represented by structural formula 1 is dispersed in the organic solvent, the obtained solution of the compound represented by structural formula 1 is sprayed on the surface of the positive electrode material layer, and the positive electrode material layer containing the compound represented by structural formula 1 is obtained after drying and removing the solvent.

In the case of the compound represented by structural formula 1 is mixed in the positive electrode material layer, its preparation method may be as follows.

1. The positive electrode paste for preparing the positive electrode material layer contains the compound represented by structural formula 1. Specifically, the compound represented by structural formula 1, the positive electrode active material, the positive electrode conductive agent and the positive electrode binder can be dispersed in an organic solvent to prepare the positive electrode paste, and the positive electrode paste is coated and dried to form the positive electrode material layer.

2. After the positive electrode material layer is obtained, soak the positive electrode material layer in the solution of the compound represented by structural formula 1, make the compound represented by structural formula 1 penetrate into the positive electrode material layer, and dry to remove the solvent to obtain the positive electrode material layer containing the compound represented by structural formula 1.

In some embodiments, the positive electrode further includes a positive electrode current collector, and the positive electrode material layer covers the surface of the positive electrode current collector.

The positive electrode current collector is selected from metal materials that can conduct electrons. Preferably, the positive electrode current collector includes one or more of Al, Ni, tin, copper and stainless steel. In a more preferred embodiment, the positive electrode current collector is selected from aluminum foil.

In some embodiments, the negative electrode includes a negative electrode material layer. The negative electrode material layer including a negative electrode active material selected from at least one of a silicon-based negative electrode, a carbon-based negative electrode, a lithium-based negative electrode and a tin-based negative electrode.

Wherein the silicon-based negative electrode includes one or more of silicon materials, silicon oxides, silicon-carbon composite materials and silicon alloy materials. The carbon-based negative electrode includes one or more of graphite, hard carbon, soft carbon, graphene and mesocarbon microbeads. The lithium-based negative electrode includes one or more of metal lithium or lithium alloy. The lithium alloy may be at least one of lithium silicon alloy, lithium sodium alloy, lithium potassium alloy, lithium aluminum alloy, lithium tin alloy and lithium indium alloy. The tin-based negative electrode includes one or more of tin, tin carbon, tin oxide and tin metal compounds.

In some embodiments, the negative electrode material layer further includes a negative electrode binder and a negative electrode conductive agent. The negative electrode active material, the negative electrode binder and the negative electrode conductive agent are blended to obtain the negative electrode material layer.

The options of the negative electrode binder and negative electrode conductive agent are the same as those of the positive electrode binder and positive electrode conductive agent, respectively, which will not be repeated here.

In some embodiments, the negative electrode further includes a negative electrode current collector, and the negative electrode material layer covers the surface of the negative electrode current collector.

The negative electrode current collector is selected from metal materials that can conduct electrons. Preferably, the negative electrode current collector includes one or more of Al, Ni, tin, copper and stainless steel. In a more preferred embodiment, the negative electrode current collector is selected from copper foil.

In some embodiments, the non-aqueous electrolyte includes a solvent, a lithium salt and an additive, and the additive includes at least one of cyclic sulfate compound, sultone compound, cyclic carbonate compound, unsaturated phosphate compound and nitrile compound.

Under the above conditions, the inventors found that when the additive mentioned above is added to the non-aqueous electrolyte, it has a good cooperation effect with the positive electrode containing the compound represented by formula 1, and can synergistically improve the thermal shock resistance of the battery. It is speculated that the additive mentioned above and the compound represented by formula 1 in the positive electrode participate in the formation of the passivation film on the positive electrode surface together, and the cooperation of the additive and the compound can improve the stability of the positive electrode active material.

In some embodiments, the additive is added in an amount of 0.01%-30% based on the total mass of the non-aqueous electrolyte being 100%;

It should be noted that, unless otherwise specified, in general, the addition amount of any optional substance of the additive in the non-aqueous electrolyte is below 10%. Preferably the addition amount is 0.1-5%, more preferably 0.1-2%. Specifically, the addition amount of any optional substance of the additive may be 0.05%, 0.08%, 0.1%, 0.5%, 0.8%, 1%, 1.2%, 1.5%, 1.8%, 2%, 2.2%, 2.5%, 2.8%, 3%, 3.2%, 3.5%, 3.8%, 4%, 4.5%, 5%, 5.5%, 6%, 6.5%, 7%, 7.5%, 7.8%, 8%, 8.5%, 9%, 9.5%, 10%.

In some embodiments, when the additive is selected from fluoroethylene carbonate, the addition amount of fluoroethylene carbonate is 0.05%-30%, based on the total mass of the non-aqueous electrolyte being 100%.

In some embodiments, the cyclic sulfate compound is at least one selected from ethylene sulfate, trimethylene sulfite or methyl ethylene sulfate;

the sultone compound is at least one selected from 1,3-propane sultone, 1,4-butane sultone or 1,3-propene sultone;

the cyclic carbonate compound is selected from at least one of vinylene carbonate, vinylethylene carbonate, fluoroethylene carbonate or the compound represented by structural formula 2.

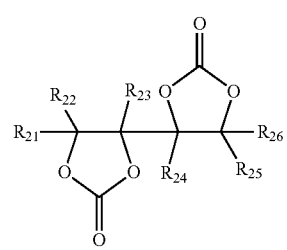

Structural formula 2 in structural formula 2, $R_{21}$, $R_{22}$, $R_{23}$, $R_{24}$, $R_{25}$ and $R_{26}$ are each independently selected from one of a hydrogen atom, a halogen atom and a C1-C5 group;

the unsaturated phosphate compound is selected from at least one of the compounds represented by structural formula 3:

Structural formula 3

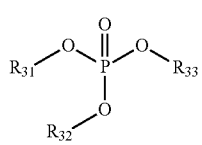

in structural formula 3, $R_{31}$, $R_{32}$ and $R_{32}$ are each independently selected from a C1-C5 saturated hydrocarbon group, an unsaturated hydrocarbon group, a halogenated hydrocarbon group and —Si$(C_mH_{2m+1})_3$, m is a natural number of 1-3, and at least one of $R_{31}$, $R_{32}$ and $R_{33}$ is an unsaturated hydrocarbon group; Optionally, the unsaturated phosphate compounds may be at least one selected from the group consisting of phosphoric acid tripropargyl ester, dipropargyl methyl phosphonate, dipropargyl ethyl phosphate, dipropargyl propyl phosphate, dipropargyl trifluoromethyl phosphate, dipropargyl-2, 2, 2-trifluoroethyl phosphate, dipropargyl-3, 3, 3-trifluoropropyl phosphate, dipropargyl hexafluoroisopropyl phosphate, phosphoric acid triallyl ester, diallyl methyl phosphate, diallyl ethyl phosphate, diallyl propyl phosphate, diallyl trifluoromethyl phosphate, diallyl-2, 2, 2-trifluoroethyl phosphate, diallyl-3, 3, 3-trifluoropropyl phosphate or diallyl hexafluoroisopropyl phosphate.

the nitrile compound includes one or more of butanedinitrile, glutaronitrile, ethylene glycol bis (propionitrile) ether, hexanetricarbonitrile, adiponitrile, pimelic dinitrile, hexamethylene dicyanide, azelaic dinitrile and sebaconitrile.

In other embodiments, the additive may also include other additives that can improve the performance of the battery. For example, the additive for reducing impedance, such as lithium difluorophosphate, lithium difluoroxalate borate, phosphoric anhydride, lithium tetrafluoroborate, etc. Additives for inhibiting impedance growth, such as lithium difluorophosphate bis-oxalate. Additives to improve battery safety, such as flame retardant additives such as fluorophosphate and cyclophosphazene, or overcharge prevention additives such as tert-amylbenzene and tert-butyl benzene.

In some embodiments, the solvent includes one or more of ether solvent, nitrile solvent, carbonate solvent and carboxylic acid solvent.

In some embodiments, ether solvents include cyclic ethers or chain ethers, preferably chain ethers with 3-10 carbon atoms and cyclic ethers with 3-6 carbon atoms, and the specific cyclic ethers may be but are not limited to 1,3-dioxolane (DOL), 1,4-dioxooxane (DX), crown ethers, tetrahydrofuran (THF), 2-methyltetrahydrofuran (2-CH3-THF) and 2-trifluoromethyltetrahydrofuran (2-CF3-THF). Specifically, the chain ethers may be but not limited to dimethoxymethane, diethoxymethane, ethoxymethoxymethane, ethylene glycol di-n-propyl ether, ethylene glycol di-n-butyl ether and diethylene glycol dimethyl ether. Dimethoxymethane, diethoxymethane and ethoxymethoxymethane with low viscosity and high ionic conductivity are particularly preferred because the solvability of chain ethers and lithium-ions is high and the ion dissociation can be improved. Ether compounds may be used alone or in any combination and ratio of two or more kinds. The addition amount of ether compounds is not particularly limited, which is within the range of not significantly damaging the effect of the high-voltage lithium-ion battery of the present application. In the non-aqueous solvent volume ratio of 100%, the volume ratio is usually 1% or more, preferably 2% or more, more preferably 3% or more. Moreover, the volume ratio is usually 30% or less, preferably 25% or less, and more preferably 20% or less. When two or more ether compounds are used in combination, the total amount of ether compounds only needs to meet the above range. When the addition amount of ether compounds is within the above preferred range, it is easy to ensure the improvement effect of ionic conductivity brought by the increase of lithium-ion dissociation degree and the decrease of viscosity of chain ethers. In addition, when the negative electrode active material is a carbon material, the co-intercalation reaction of the chain ether and lithium-ions can be suppressed, so that the input-output characteristics and the charge-discharge rate characteristics can be within an appropriate range.

In some embodiments, specifically, the nitrile solvent may be but not limited to one or more of acetonitrile, glutaronitrile and malononitrile.

In some embodiments, the carbonate solvent includes cyclic carbonate or chain carbonate, and the cyclic carbonate may specifically but not exclusively be one or more of ethylene carbonate (EC), propylene carbonate (PC), γ-butyrolactone (GBL) and butylene carbonate (BC). The chain carbonate may specifically but not exclusively be one or more of dimethyl carbonate (DMC), ethyl methyl carbonate (EMC), diethyl carbonate (DEC) and dipropyl carbonate (DPC). The content of cyclic carbonate is not particularly limited, which is within the range of not significantly damaging the effect of the high-voltage lithium-ion battery of the present application. However, in the case where one is used alone, the minimal content is usually 3% by volume or more, preferably 5% by volume or more, relative to the total amount of the solvent in the non-aqueous electrolyte. With this range, the decrease of conductivity caused by the decrease of the dielectric constant of the non-aqueous electrolyte can be avoided, so the high-current discharge characteristics, the stability with respect to the negative electrode and the cycle characteristics of the non-aqueous electrolyte battery can easily reach a good range. In addition, the maximum content is usually 90% or less by volume, preferably 85% or less by volume, and more preferably 80% or less by volume. With this range, the oxidation/reduction resistance of the non-aqueous electrolyte can be improved, thus contributing to the improvement of the stability during high-temperature storage. The content of the chain carbonate is not particularly limited, but it is usually 15% or more by volume, preferably 20% or more by volume, and more preferably 25% or more by volume, relative to the total amount of the solvent in the non-aqueous electrolyte. In addition, the volume ratio is usually 90% or less, preferably 85% or less, and more preferably 80% or less. By setting the content of the chain carbonate in the above range, the viscosity of the non-aqueous electrolyte can be easily kept with an appropriate range, and the decrease of ionic conductivity can be suppressed, thus contributing to a good range of the output characteristics of the non-aqueous electrolyte battery. When two or more kinds of chain carbonates are used in combination, the total amount of the chain carbonates only needs to meet the above range.

In some embodiments, it is also preferable to use chain carbonates with fluorine atoms (hereinafter referred to as "fluorinated chain carbonates"). The number of fluorine atoms in the fluorinated chain carbonate is not particularly limited as long as it is 1 or more, but it is usually 6 or less, preferably 4 or less. When the fluorinated chain carbonate has multiple fluorine atoms, these fluorine atoms can be bonded to the same carbon or to different carbons. Examples of the fluorinated chain carbonates include fluorinated dimethyl carbonate derivatives, fluorinated ethyl methyl carbonate derivatives and fluorinated diethyl carbonate derivatives.

Carboxylic acid solvent includes cyclic carboxylic ester and/or chain carbonic ester. Examples of cyclic carboxylic ester include one or more of γ-butyrolactone, γ-valerolactone and δ-valerolactone. Examples of chain carbonic ester include one or more of methyl acetate (MA), ethyl acetate (EA), n-propyl acetate (EP), butyl acetate, propyl propionate (PP) and butyl propionate.

In some embodiments, sulfone solvent includes cyclic sulfones and chain sulfones, but preferably, in the case of cyclic sulfones, it is usually a compound with 3-6 carbon atoms, preferably 3-5 carbon atoms; and in the case of chain sulfones, it is usually a compound with 2-6 carbon atoms, preferably 2-5 carbon atoms. The addition amount of the sulfone solvent is not particularly limited, which is within the range of not significantly damaging the effect of the high-voltage lithium-ion battery of the present application. Compared with the total amount of solvent in non-aqueous electrolyte, the volume ratio is usually 0.3% or more, preferably 0.5% or more, more preferably 1% or more. Moreover, the volume ratio is usually 40% or less, preferably 35% or less, and more preferably 30% or less. When two or more kinds of sulfone solvent are used in combination, the total amount of the sulfone solvents only needs to meet the above range. When the addition amount of sulfone solvent is within the above range, the electrolyte with excellent high-temperature storage stability is easily to be obtained.

In a preferred embodiment, the solvent is a mixture of cyclic carbonic ester and chain carbonic ester.

In some embodiments, the secondary battery further includes a separator between the positive electrode and the negative electrode.

The separator may be a conventional separator, a polymer membrane, a nonwoven fabric, etc., including but not limited to single-layer PP (polypropylene), single-layer PE (polyethylene), double-layer PP/PE, double-layer PP/PP and triple-layer PP/PE/PP membranes.

The present application will be further illustrated with the following embodiments.

I. Design of Embodiments and Comparative Examples

TABLE 1

Compounds represented by structural formula 1 used in Embodiments and Comparative Examples

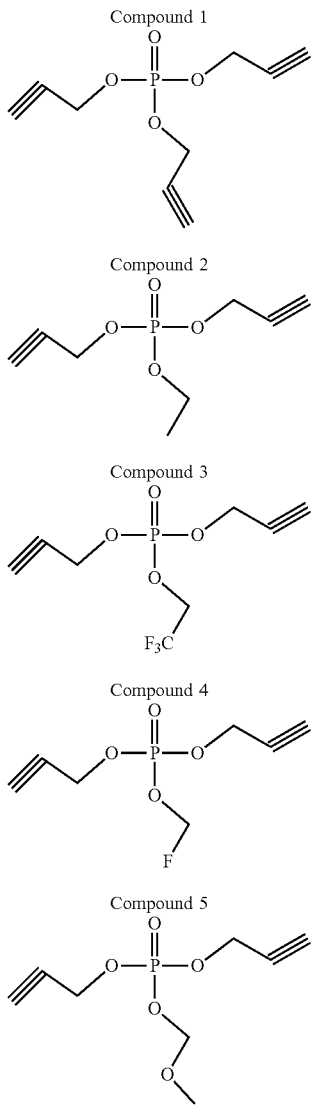

TABLE 2

Design of Embodiments and Comparative Examples

| Embodiments/Comparative Examples | Positive electrode plate | | Electrolyte additive and content | | | | |
|---|---|---|---|---|---|---|---|
| | Positive electrode active material | Compounds represented by structural formula 1 | Phosphorus content u/wt % | Element M content v/wt % | Surface density of one single surface p/mg/cm² | p · u/v | |
| Embodiment 1 | $LiNi_{0.8}Co_{0.1}Mn_{0.1}O_2$ | Compound 1 | 0.1 | 5.2 | 18 | 0.35 | DTD: 1% |
| Embodiment 2 | $LiNi_{0.8}Co_{0.1}Mn_{0.1}O_2$ | Compound 1 | 0.2 | 5.2 | 16 | 0.62 | DTD: 1% |
| Embodiment 3 | $LiNi_{0.8}Co_{0.1}Mn_{0.1}O_2$ | Compound 1 | 0.5 | 5.2 | 20 | 1.92 | DTD: 1% |
| Embodiment 4 | $LiNi_{0.8}Co_{0.1}Mn_{0.1}O_2$ | Compound 1 | 1 | 5.2 | 25 | 4.80 | DTD: 1% |
| Embodiment 5 | $LiNi_{0.8}Co_{0.1}Mn_{0.1}O_2$ | Compound 1 | 1 | 5.2 | 22 | 4.23 | DTD: 1% |
| Embodiment 6 | $LiNi_{0.8}Co_{0.1}Mn_{0.1}O_2$ | Compound 1 | 2 | 5.2 | 18 | 6.92 | DTD: 1% |
| Embodiment 7 | $LiNi_{0.8}Co_{0.1}Mn_{0.1}O_2$ | Compound 1 | 3 | 5.2 | 22 | 12.69 | DTD: 1% |
| Comparative Example 1 | $LiNi_{0.8}Co_{0.1}Mn_{0.1}O_2$ | None | 0 | 5.2 | 20 | 0 | DTD: 1% |

TABLE 2-continued

Design of Embodiments and Comparative Examples

| Embodiments/Comparative Examples | Positive electrode plate | | | | Electrolyte additive and content | | | |
|---|---|---|---|---|---|---|---|---|
| | Positive electrode active material | Compounds represented by structural formula 1 | Phosphorus content u/wt % | Element M content v/wt % | Surface density of one single surface p/mg/cm$^2$ | p · u/v | | |
| Comparative Example 2 | LiNi$_{0.8}$Co$_{0.1}$Mn$_{0.1}$O$_2$ | None | 0 | 5.2 | 20 | 0 | Compound 1: 0.5% | |
| Comparative Example 3 | LiNi$_{0.8}$Co$_{0.1}$Mn$_{0.1}$O$_2$ | None | 0 | 5.2 | 20 | 0 | DTD: 1% Compound 1: 0.5% | |
| Comparative Example 4 | LiNi$_{0.8}$Co$_{0.1}$Mn$_{0.1}$O$_2$ | Compound 1 | 0.01 | 5.2 | 18 | 0.03 | DTD: 1% | |
| Comparative Example 5 | LiNi$_{0.8}$Co$_{0.1}$Mn$_{0.1}$O$_2$ | Compound 1 | 5 | 5.2 | 28 | 21.15 | DTD: 1% | |
| Comparative Example 6 | LiNi$_{0.8}$Co$_{0.1}$Mn$_{0.1}$O$_2$ | Compound 1 | 3 | 5.2 | 20 | 16.15 | DTD: 1% | |
| Embodiment 8 | LiNi$_{0.8}$Co$_{0.1}$Mn$_{0.1}$O$_2$ | Compound 1 | 0.5 | 5.2 | 20 | 1.92 | None | |
| Embodiment 9 | LiNi$_{0.8}$Co$_{0.1}$Mn$_{0.1}$O$_2$ | Compound 1 | 0.5 | 5.2 | 20 | 1.92 | VC: 1% | |
| Embodiment 10 | LiNi$_{0.8}$Co$_{0.1}$Mn$_{0.1}$O$_2$ | Compound 1 | 0.5 | 5.2 | 20 | 1.92 | FEC: 1% | |
| Embodiment 11 | LiNi$_{0.8}$Co$_{0.1}$Mn$_{0.1}$O$_2$ | Compound 1 | 0.5 | 5.2 | 20 | 1.92 | PS: 1% | |
| Comparative Example 7 | LiNi$_{0.8}$Co$_{0.1}$Mn$_{0.1}$O$_2$ | None | 0 | 5.2 | 20 | 0 | None | |
| Comparative Example 8 | LiNi$_{0.8}$Co$_{0.1}$Mn$_{0.1}$O$_2$ | None | 0 | 5.2 | 20 | 0 | VC: 1% | |
| Comparative Example 9 | LiNi$_{0.8}$Co$_{0.1}$Mn$_{0.1}$O$_2$ | None | 0 | 5.2 | 20 | 0 | FEC: 1% | |
| Comparative Example 10 | LiNi$_{0.8}$Co$_{0.1}$Mn$_{0.1}$O$_2$ | None | 0 | 5.2 | 20 | 0 | PS: 1% | |
| Embodiment 12 | LiNi$_{0.8}$Co$_{0.1}$Mn$_{0.1}$O$_2$ | Compound 2 | 0.5 | 5.2 | 20 | 1.92 | DTD: 1% | |
| Embodiment 13 | LiNi$_{0.8}$Co$_{0.1}$Mn$_{0.1}$O$_2$ | Compound 3 | 0.5 | 5.2 | 20 | 1.92 | DTD: 1% | |
| Embodiment 14 | LiNi$_{0.8}$Co$_{0.1}$Mn$_{0.1}$O$_2$ | Compound 4 | 0.5 | 5.2 | 20 | 1.92 | DTD: 1% | |
| Embodiment 15 | LiNi$_{0.8}$Co$_{0.1}$Mn$_{0.1}$O$_2$ | Compound 1 | 0.5 | 5.2 | 20 | 1.92 | DTD: 1% | |
| Embodiment 16 | LiNi$_{0.8}$Co$_{0.1}$Mn$_{0.1}$O$_2$ | Compound 1 | 0.5 | 4.5 | 19 | 2.11 | DTD: 1% | |
| Embodiment 17 | LiNi$_{0.5}$Co$_{0.2}$Mn$_{0.3}$O$_2$ | Compound 1 | 0.2 | 20.5 | 16 | 0.16 | DTD: 1% | |
| Embodiment 18 | LiNi$_{0.5}$Co$_{0.2}$Mn$_{0.3}$O$_2$ | Compound 1 | 0.4 | 20.5 | 18 | 0.35 | DTD: 1% | |
| Embodiment 19 | LiNi$_{0.5}$Co$_{0.2}$Mn$_{0.3}$O$_2$ | Compound 1 | 1.1 | 20.5 | 19 | 1.02 | DTD: 1% | |
| Embodiment 20 | LiNi$_{0.5}$Co$_{0.2}$Mn$_{0.3}$O$_2$ | Compound 1 | 2.1 | 20.5 | 22 | 2.25 | DTD: 1% | |
| Embodiment 21 | LiNi$_{0.6}$Co$_{0.2}$Mn$_{0.2}$O$_2$ | Compound 1 | 0.6 | 14.8 | 18 | 0.73 | DTD: 1% | |
| Embodiment 22 | LiNi$_{0.7}$Co$_{0.1}$Mn$_{0.2}$O$_2$ | Compound 1 | 0.5 | 9.4 | 19 | 1.01 | DTD: 1% | |
| Embodiment 23 | LiMn$_{1.5}$O$_4$ | Compound 1 | 0.8 | 58.1 | 16 | 0.22 | DTD: 1% | |
| Embodiment 24 | LiNi$_{0.5}$Mn$_{1.5}$O$_4$ | Compound 1 | 0.5 | 42.2 | 20 | 0.24 | DTD: 1% | |
| Embodiment 25 | 0.5Li$_2$MnO$_{3.0.5}$LiNi$_{0.5}$Mn$_{0.5}$O$_2$ | Compound 1 | 0.3 | 48.6 | 22 | 0.14 | DTD: 1% | |
| Comparative Example 11 | LiNi$_{0.8}$Co$_{0.1}$Al$_{0.1}$O$_2$ | None | 0 | 4.5 | 19 | 0 | DTD: 1% | |
| Comparative Example 12 | LiNi$_{0.5}$Co$_{0.2}$Mn$_{0.3}$O$_2$ | None | 0 | 20.5 | 18 | 0 | DTD: 1% | |
| Comparative Example 13 | LiNi$_{0.5}$Co$_{0.2}$Mn$_{0.3}$O$_2$ | None | 0 | 20.5 | 18 | 0 | DTD: 1% Compound 1: 0.5% | |
| Comparative Example 14 | LiNi$_{0.6}$Co$_{0.2}$Mn$_{0.2}$O$_2$ | None | 0 | 14.8 | 18 | 0 | DTD: 1% | |
| Comparative Example 15 | LiNi$_{0.7}$Co$_{0.1}$Mn$_{0.2}$O$_2$ | None | 0 | 9.4 | 19 | 0 | DTD: 1% | |
| Comparative Example 16 | LiMn$_2$O$_4$ | None | 0 | 58.1 | 16 | 0 | DTD: 1% | |
| Comparative Example 17 | LiNi$_{0.5}$Mn$_{1.5}$O$_4$ | None | 0 | 42.2 | 20 | 0 | DTD: 1% | |
| Comparative Example 18 | 0.5MnO$_{3.0.5}$LiNi$_{0.5}$Mn$_{0.5}$O$_2$ | None | 0 | 48.6 | 22 | 0 | DTD: 1% | |

II. Preparation of Lithium-Ion Batteries Used in Embodiments and Comparative Examples 1) Preparation of Positive Electrode Plate Step 1: Add PVDF as binder and unsaturated phosphate as shown in Table 2 into NMP solvent, and fully and evenly stir to obtain PVDF glue solution with unsaturated phosphate.

Step 2: Add the conductive agent (super P+CNT) into PVDF glue solution, and fully stir it evenly.

Step 3: Continue to add the positive electrode active material shown in Table 2, and fully and evenly stir it to finally obtain the expected positive electrode paste. The addition amount of the compound represented by structural formula 1 and positive electrode active material is based on the conversion of elements phosphorus and M shown in Table 2.

Step 4: Uniformly coat the positive electrode paste on the positive electrode current collector (such as aluminum foil), and the surface density of the coated single surface is shown in Table 2, and then dry, roll, die-cut or strip to obtain a positive electrode sheet.

2) Preparation of negative electrode plate Step 1: Weigh each substance according to the ratio of graphite (Shanghai Shanshan, FSN-1):conductive carbon (super P):sodium carboxymethyl cellulose (CMC):styrene-butadiene rubber (SBR)=96.3:1.0:1.2:1.5 (mass ratio).

Step 2: Firstly, add CMC into pure water according to the solid content of 1.5%, and fully and evenly stir it (for example, the stirring time is 120 min) to prepare a transparent CMC glue solution.

Step 3: Add conductive carbon (super P) into CMC glue solution, and fully and evenly stir it (for example, stirring time is 90 min) to prepare a conductive adhesive.

Step 4: Continue to add graphite, fully and evenly stir it, and finally obtain the expected negative electrode paste.

Step 5: Evenly coat the negative electrode paste on the copper foil, and dry, roll, die-cut or strip to obtain a negative electrode plate.

3) Preparation of Non-Aqueous Electrolyte

Mix ethylene carbonate (EC), diethyl carbonate (DEC) and ethyl methyl carbonate (EMC) according to the mass ratio of EC:DEC:EMC=1:1:1, and then add the additives with the percentage mass content shown in Table 2, and then add lithium hexafluorophosphate (LiPF$_6$) until the molar concentration is 1 mol/L.

4) Preparation of Lithium-Ion Battery Core

Assemble the obtained positive electrode plate and the negative electrode plate into a laminated flexible battery core.

5) Injection and Formation of Battery Core

In a glove box with dew point controlled below −40° C., inject the electrolyte prepared above into the battery core, and then vacuum pack to make a lithium-ion battery, and let it stand for 24 hours. Then follow the steps below to carry out the formation of the first charge: charging at 0.05 C constant current for 180 min, charging at 0.2 C constant current to 3.95V, vacuum sealing for the second time, then further charging to 4.2V at 0.2 C constant current, and then discharging to 3.0V at 0.2 C constant current after letting stand for 24 h.

III. Performance Test

The positive electrode plates and batteries prepared in Embodiments 1-25 and Comparative Examples 1-18 were tested as follows:

1. Test for the initial capacity of lithium-ion secondary battery: the formed battery was charged to 4.2V at normal temperature at 1 C constant current, then charged at constant current and constant voltage until the current was less than or equal to 0.05 C, then discharged to 3.0V at 1 C constant current, and the initial discharge capacity of the battery was measured.

2. Test for high-temperature cycle performance of lithium-ion secondary battery: at 45° C., the formed battery was charged to 4.2V at 1 C constant current and constant voltage, then charged at constant voltage until the current dropped to 0.05 C, and then discharged at 1 C constant current to 3.0V. The above steps were repeated, the the first discharge capacity and last discharge capacity were recorded.

The capacity retention rate of high-temperature cycle was calculated according to the following formula:

Capacity retention rate (%)=last discharge capacity/first discharge capacity×100%.

3. Test for thermal shock of lithium-ion secondary battery: at 25° C., the lithium-ion secondary batteries prepared in Embodiments and Comparative Examples were left standing for 5 minutes, charged to 4.2V at a constant current rate of 1 C, then charged at a constant voltage until the current was less than or equal to 0.05 C, and then left standing for 5 minutes. Then, the lithium-ion secondary battery was placed in an oven, and the oven temperature was set to be raised from 25° C. to 130° C. at a rate of 2° C./min, and the temperature was preserved for 2 hours. The temperature of the battery surface and the battery condition during the heating process and the heat preservation process were monitored.

(1) The Performance Test Results of Lithium-Ion Batteries Prepared in Embodiments 1-7 and Comparative Examples 1-6 are Shown in Table 3:

TABLE 3

| Embodiments/Comparative Examples | Battery performance | | Thermal shock test | |
|---|---|---|---|---|
| | Initial capacity (mAh) | Capacity retention ate after 500 cycles at 45° C., 1 C. | Maximum surface temperature of battery/° C. | State of thermal shock process |
| Embodiment 1 | 1038 | 83.9 | 180.1 | No obvious phenomenon |
| Embodiment 2 | 1054 | 85.5 | 174.1 | No obvious phenomenon |
| Embodiment 3 | 1060 | 86.2 | 172.5 | No obvious phenomenon |
| Embodiment 4 | 1052 | 85.1 | 175.7 | No obvious phenomenon |
| Embodiment 5 | 1058 | 85.9 | 173.2 | No obvious phenomenon |
| Embodiment 6 | 1035 | 83.6 | 162.5 | No obvious phenomenon |
| Embodiment 7 | 1022 | 82.0 | 157.3 | No obvious phenomenon |
| Comparative Example 1 | 985 | 77.1 | 208.9 | Smoke, fire |
| Comparative Example 2 | 988 | 78.0 | 205.1 | Smoke, fire |
| Comparative Example 3 | 992 | 78.6 | 203.9 | Smoke, fire |
| Comparative Example 4 | 1004 | 79.9 | 201.5 | Smoke, fire |
| Comparative Example 5 | 1000 | 79.5 | 150.3 | No obvious phenomenon |
| Comparative Example 6 | 995 | 80.3 | 158.1 | No obvious phenomenon |

According to Embodiments 1-7 and Comparative Examples 1-6, when the positive electrode active materials were of the same type, and the phosphorus content, manganese content in the positive electrode material layer and the surface density of single side of the positive electrode met the preset relationship of 0.05≤p·u/v≤15, there was no runaway or ignition in the thermal shock test, and the lithium-ion secondary battery had high safety performance, high-temperature cycle performance and initial capacity.

From the test results of Embodiments 1-7, it can be seen that with the increase of the value of p·u/v, the initial capacity, high-temperature cycle performance and thermal shock resistance of lithium-ion secondary battery first increased and then decreased, which indicates that the phosphorus content, manganese content and surface density of one single surface of the positive electrode were related to the electrochemical performance and safety performance of lithium-ion secondary battery, especially when 0.5≤p·u/v≤5, the lithium-ion secondary battery had the best initial capacity, high-temperature cycle performance and thermal shock resistance.

For the lithium-ion secondary batteries of Comparative Examples 1-3, the positive electrode material layer contains no element phosphorus, and the maximum surface temperature of the lithium-ion secondary battery is significantly increased during thermal shock test, and smoke and fire occurred, thus the safety performance of the lithium-ion secondary battery was low. For the lithium-ion secondary battery of Comparative Example 4, due to the low content of element phosphorus in the positive electrode material layer, the maximum surface temperature of the lithium-ion battery during thermal shock test was significantly increased, and smoke and fire occurred, the safety performance was low. For the lithium-ion secondary batteries of Comparative Examples 5-6, the content of element phosphorus in the positive electrode material layer was higher, and the maximum surface temperature of the battery was lower during the thermal shock test, and there was no runaway or ignition phenomenon. However, the phosphorus content, manganese content in the positive electrode material layer and the surface density of one single surface of the positive electrode did not meet the preset relationship of $0.05 \leq p \cdot u/v \leq 15$, the discharge capacity of the battery was low, and the cycle performance was not high, which could not give consideration to both the electrochemical performance and safety performance of the battery.

From the test results of Comparative Example 2, Comparative Example 3 and Embodiment 3, it can be seen that when the compound represented by structural formula 1 was added to the non-aqueous electrolyte, the performance improvement of the battery was far less than that when the compound represented by structural formula 1 was added to the positive electrode material layer. This may be because the compound represented by structural formula 1 has higher viscosity and lower conductivity, the initial efficiency, internal resistance and cycle performance of the battery would be affected when it was added to the electrolyte.

(2) The Performance Test Results of Lithium-Ion Batteries Prepared in Embodiments 3, 8-11 and Comparative Examples 1, 7-10 are Shown in Table 4:

TABLE 4

| Embodiments/ Comparative Examples | Battery performance | | Thermal shock test | |
|---|---|---|---|---|
| | Initial capacity (mAh) | Capacity retention rate after 500 cycles at 45° C., 1 C. | Maximum surface temperature of battery/ ° C. | State of thermal shock process |
| Embodiment 3 | 1060 | 86.2 | 172.5 | No obvious phenomenon |
| Embodiment 8 | 1016 | 81.1 | 181.4 | No obvious phenomenon |
| Embodiment 9 | 1053 | 84.5 | 174.2 | No obvious phenomenon |
| Embodiment 10 | 1050 | 84.1 | 173.1 | No obvious phenomenon |
| Embodiment 11 | 1051 | 84.7 | 175.2 | No obvious phenomenon |
| Comparative Example 1 | 985 | 77.1 | 208.9 | Smoke, fire |
| Comparative Example 7 | 930 | 71.2 | 214.3 | Smoke, fire |
| Comparative Example 8 | 975 | 76.1 | 210.3 | Smoke, fire |
| Comparative Example 9 | 981 | 76.7 | 209.4 | Smoke, fire |
| Comparative Example 10 | 971 | 75.5 | 211.2 | Smoke, fire |

From the test results of Embodiments 3, 8-11, it can be seen that in the battery containing the positive electrode provided by the present application, adding the above additives DTD (ethylene sulfate), VC (ethylene carbonate), FEC (fluoroethylene carbonate) or PS (1,3-propane suhone) to the non-aqueous electrolyte can further improve the high-temperature cycle performance of the battery and reduce the maximum surface temperature of the battery in the thermal shock test. It is speculated that the compound represented by structural formula 1 in the positive electrode and the additives mentioned above participated in the formation of the passivation film on the electrode surface together, thus obtaining a passivation film with excellent thermal stability, effectively reducing the reaction of the electrolyte on the electrode surface and improving the safety of the battery.

More preferably, among the additives mentioned above, it can be seen that DTD combined with the positive electrode containing the compound represented by structural formula 1 can improve the high-temperature cycle performance and thermal shock resistance of the battery most obviously.

(3) The Performance Test Results of Lithium-Ion Batteries Prepared in Embodiments 3, 12-15 are Shown in Table 5:

TABLE 5

| Embodiments/ Comparative Examples | Battery performance | | Thermal shock test | |
|---|---|---|---|---|
| | Initial capacity (mAh) | Capacity retention rate after 500 cycles at 45° C., 1 C. | Maximum surface temperature of battery/ ° C. | State of thermal shock process |
| Embodiment 3 | 1060 | 86.2 | 172.5 | No obvious phenomenon |
| Embodiment 12 | 1059 | 86.0 | 172.1 | No obvious phenomenon |
| Embodiment 13 | 1058 | 86.2 | 171.5 | No obvious phenomenon |
| Embodiment 14 | 1059 | 86.1 | 172.9 | No obvious phenomenon |
| Embodiment 15 | 1057 | 85.8 | 171.8 | No obvious phenomenon |

It can be seen from the test results in Table 5 that for different compounds represented by structural formula 1, when the phosphorus content, manganese content and surface density of one single surface of the positive electrode material layer met the preset relationship of $0.05 \leq p \cdot u/v \leq 15$, they played a similar role, having certain improvement effect on battery capacity and safety, which showed that the relational expression provided by the present application was suitable for different compounds represented by structural formula 1.

(4) The performance test results of lithium-ion batteries prepared in Embodiments 16-25 and Comparative Examples 11-18 are shown in Table 6:

TABLE 6

| Embodiments/ Comparative Examples | Battery performance | | Thermal shock test | |
|---|---|---|---|---|
| | Initial capacity (mAh) | Capacity retention rate after 500 cycles at 45° C., 1 C. | Maximum surface temperature of battery/ ° C. | State of thermal shock process |
| Embodiment 16 | 1065 | 86.0 | 175.6 | No obvious phenomenon |
| Embodiment 17 | 953 | 86.9 | 159.8 | No obvious phenomenon |
| Embodiment 18 | 958 | 87.4 | 158.2 | No obvious phenomenon |
| Embodiment 19 | 979 | 90.1 | 155.4 | No obvious phenomenon |
| Embodiment 20 | 978 | 89.2 | 156.0 | No obvious phenomenon |
| Embodiment 21 | 1000 | 88.0 | 164.2 | No obvious phenomenon |

TABLE 6-continued

| Embodiments/ Comparative Examples | Battery performance | | Thermal shock test | |
|---|---|---|---|---|
| | Initial capacity (mAh) | Capacity retention rate after 500 cycles at 45° C., 1 C. | Maximum surface temperature of battery/ ° C. | State of thermal shock process |
| Embodiment 22 | 1021 | 87.2 | 168.6 | No obvious phenomenon |
| Embodiment 23 | 871 | 90.2 | 141.2 | No obvious phenomenon |
| Embodiment 24 | 891 | 87.1 | 149.5 | No obvious phenomenon |
| Embodiment 25 | 885 | 88.2 | 146.2 | No obvious phenomenon |
| Comparative Example 11 | 998 | 78.5 | 209.4 | Smoke, fire |
| Comparative Example 12 | 914 | 80.5 | 175.4 | No obvious phenomenon |
| Comparative Example 13 | 919 | 81.7 | 171.2 | No obvious phenomenon |
| Comparative Example 14 | 941 | 80.0 | 179.2 | No obvious phenomenon |
| Comparative Example 15 | 955 | 78.5 | 200.5 | Smoke, fire |
| Comparative Example 16 | 821 | 82.3 | 154.4 | No obvious phenomenon |
| Comparative Example 17 | 846 | 80.2 | 159.2 | No obvious phenomenon |
| Comparative Example 18 | 835 | 81.4 | 157.9 | No obvious phenomenon |

According to the test results of Embodiment 16 and Comparative Example 11, the element M in the positive electrode active material was Al, and when the phosphorus content, aluminum content and surface density of one single surface of the positive electrode met the preset relationship of $0.05 \leq p \cdot u/v \leq 15$, the battery also had good high-temperature cycle performance and thermal shock resistance.

According to the test results of Embodiments 17-20 and Comparative Examples 12 and 13, when $LiNi_{0.5}Co_{0.2}Mn_{0.3}O_2$ was used as the positive electrode active material, when the phosphorus content, aluminum content and surface density of one single surface of the positive electrode met the preset relationship of $0.05 \leq p \cdot u/v \leq 15$, the battery also had good high-temperature cycle performance and thermal shock resistance.

According to the test results of Embodiments 21-25 and Comparative Examples 14-18, when the content of manganese in the positive electrode plate of lithium-ion secondary battery was high, smoke and fire would not occur even though the compound represented by structural formula 1 was not added in the positive electrode plate, indicating that high content of manganese could improve the structural stability of the positive electrode active material and reduce the decomposed oxygen of the positive electrode active material, but the energy density of the battery would decrease. However, when the compound represented by structural formula 1 was added to the positive electrode plate, a stable solid electrolyte interface film containing element phosphorus could be formed on the positive electrode material layer. The interface film could inhibit excessive side reactions between the positive electrode active material and the electrolyte. Further, through the design of the surface density of one single surface of the positive electrode, the three cooperate to inhibit the gas generation of the battery and reduce the heat generation, thereby reducing the risk of runaway of the lithium-ion secondary battery, improving the high-temperature cycle performance of the lithium-ion secondary battery and making the lithium-ion secondary battery have higher safety performance and energy density.

The above descriptions are only the preferred embodiments of the present application, not intended to limit the present application. Any modification, equivalent replacement and improvement within the spirit and principle of the present application shall be included in the scope of protection of the present application.

The invention claimed is:

1. A secondary battery, comprising a positive electrode, the positive electrode comprises a positive electrode material layer, characterized in that the positive electrode material layer comprises a positive electrode active material and a compound represented by structural formula 1:

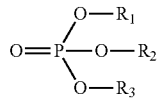

Structural formula 1 wherein $R_1$, $R_2$ and $R_3$ are each independently selected from an alkyl group with 1-5 carbon atoms, a fluoroalkyl group with 1-5 carbon atoms, an ether group with 1-5 carbon atoms, a fluoroether group with 1-5 carbon atoms and an unsaturated hydrocarbon group with 2-5 carbon atoms, and at least one of $R_1$, $R_2$ and $R_3$ is an unsaturated hydrocarbon group with 2-5 carbon atoms;

the positive electrode active material comprises one or more of the compounds represented by formula (1) and formula (2);

$$Li_{1+x}Ni_aCo_bM'_{1-a-b}O_{2-y}A_y \quad \text{formula (1)}$$

$$Li_{1+z}Mn_cL_{2-c}O_{4-d}B_d \quad \text{formula (2)}$$

in formula (1), $-0.1 \leq x \leq 0.2$, $0<a<1$, $0 \leq b<1$, $0<a+b<1$, $0 \leq y<0.2$, M' comprises one or more of Mn and Al, and comprises none, one or more of Sr, Mg, Ti, Ca, Zr, Zn, Si, Fe and Ce, A comprises one or more of S, N, F, Cl, Br and I;

in formula (2), $-0.1 \leq z \leq 0.2$, $0<c \leq 2$, $0 \leq d<1$, L comprises one or more of Ni, Fe, Cr, Ti, Zn, V, Al, Mg, Zr and Ce, and B comprises one or more of S, N, F, Cl, Br and I;

the positive electrode material layer meets the following requirements:

$$0.05 \leq p \cdot u/v \leq 15$$

wherein, u is the percentage mass content of element phosphorus in the positive electrode material layer, and the unit is wt %;

v is the percentage mass content of element M in the positive electrode material layer, element M is selected from one or two of Mn and Al, and the unit is wt %;

p is a surface density of one single surface of the positive electrode material layer, and the unit is mg/cm².

2. The secondary battery of claim 1, wherein the positive electrode material layer meets the following requirements:

$$0.1 \leq p \cdot u/v \leq 10.$$

3. The secondary battery of claim 1, wherein the positive electrode material layer meets the following requirements:

$$0.5 \leq p \cdot u/v \leq 5.$$

4. The secondary battery of claim 1, wherein the compound represented by structural formula 1 comprises at least one selected from the group consisting of phosphoric acid tripropargyl ether, dipropargyl methyl phosphonate, dipropargyl fluoromethyl phosphonate, dipropargyl methoxymethyl phosphate, dipropargyl ethyl phosphate, dipropargyl propyl phosphate, trifluoromethyl dipropargyl phosphate, 2, 2, 2-trifluoroethyl phosphate, dipropargyl 3, 3, 3-trifluoropropyl phosphate, hexafluoroisopropyl dipropargyl phosphate, phosphoric acid triallyl ester, diallyl methyl phosphate, diallyl ethyl phosphate, diallyl propyl phosphate, trifluoromethyl diallyl phosphate, 2, 2, 2-trifluoroethyl diallyl phosphate, dipropargyl methyl ether phosphate, dipropargyl fluoromethyl ether phosphate, diallyl 3, 3, 3-trifluoropropyl phosphate or diallyl hexafluoroisopropyl phosphate.

5. The secondary battery of claim 1, wherein surface of the positive electrode material layer is detected by X-ray photoelectron spectroscopy, and when 1s peak of carbon is obtained at 284.5 eV, a characteristic peak of element phosphorus appears at the range of 130-140 eV.

6. The secondary battery of claim 1, wherein a percentage mass content (u) of element phosphorus in the positive electrode material layer is 0.1 wt %-3 wt %.

7. The secondary battery of claim 1, wherein a percentage mass content (u) of element phosphorus in the positive electrode material layer is 0.1 wt %-2 wt %.

8. The secondary battery of claim 1, wherein a percentage mass content (v) of element M in the positive electrode material layer is 3 wt %-60 wt %.

9. The secondary battery of claim 1, wherein a percentage mass content (v) of element M in the positive electrode material layer is 3 wt %-30 wt %.

10. The secondary battery of claim 1, wherein the surface density of one single surface (p) of the positive electrode material layer is 10-30 mg/cm².

11. The secondary battery of claim 1, wherein the surface density of one single surface (p) of the positive electrode material layer is 15-20 mg/cm².

12. The secondary battery of claim 1, further comprising a non-aqueous electrolyte, wherein the non-aqueous electrolyte comprises an additive, and the additive comprises at least one of cyclic sulfate compound, sultone compound, cyclic carbonate compound, unsaturated phosphate compound and nitrile compound.

13. The secondary battery of claim 12, wherein the additive is added in an amount of 0.01%-30% based on the total mass of the non-aqueous electrolyte being 100%.

14. The secondary battery of claim 12, wherein the additive is added in an amount of 0.01%-10% based on the total mass of the non-aqueous electrolyte being 100%.

15. The secondary battery of claim 12, wherein the cyclic sulfate compound is at least one selected from ethylene sulfate, trimethylene sulfite or methyl ethylene sulfate;

the sultone compound is at least one selected from 1,3-propane sultone, 1,4-butane sultone or 1,3-propene sultone;

the cyclic carbonate compound is selected from at least one of vinylene carbonate, vinylethylene carbonate, fluoroethylene carbonate or the compound represented by structural formula 2,

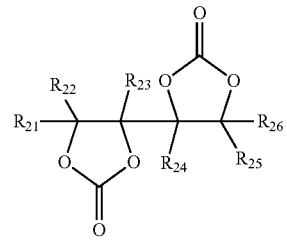

Structural formula 2 in structural formula 2, $R_{21}$, $R_{22}$, $R_{23}$, $R_{24}$, $R_{25}$ and $R_{26}$ are each independently selected from one of a hydrogen atom, a halogen atom and a C1-05 group;

the unsaturated phosphate compound is selected from at least one of the compounds represented by structural formula 3:

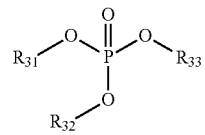

Structural formula 3 in structural formula 3, $R_{31}$, $R_{32}$ and $R_{32}$ are each independently selected from a C1-05 saturated hydrocarbon group, an unsaturated hydrocarbon group, a halogenated hydrocarbon group and —Si($C_mH_{2m+1}$)$_3$, m is a natural number of 1-3, and at least one of $R_{31}$, $R_{32}$ and $R_{33}$ is an unsaturated hydrocarbon group;

the nitrile compound comprises one or more of butanedinitrile, glutaronitrile, ethylene glycol bis (propionitrile) ether, hexanetricarbonitrile, adiponitrile, pimelic dinitrile, hexamethylene dicyanide, azelaic dinitrile and sebaconitrile.

* * * * *